Oct. 4, 1927. C. H. EGELHOFF Re. 16,760
PROCESS OF FORMING AN ARTISTIC PAINT FINISH
Original Filed Jan. 27, 1926
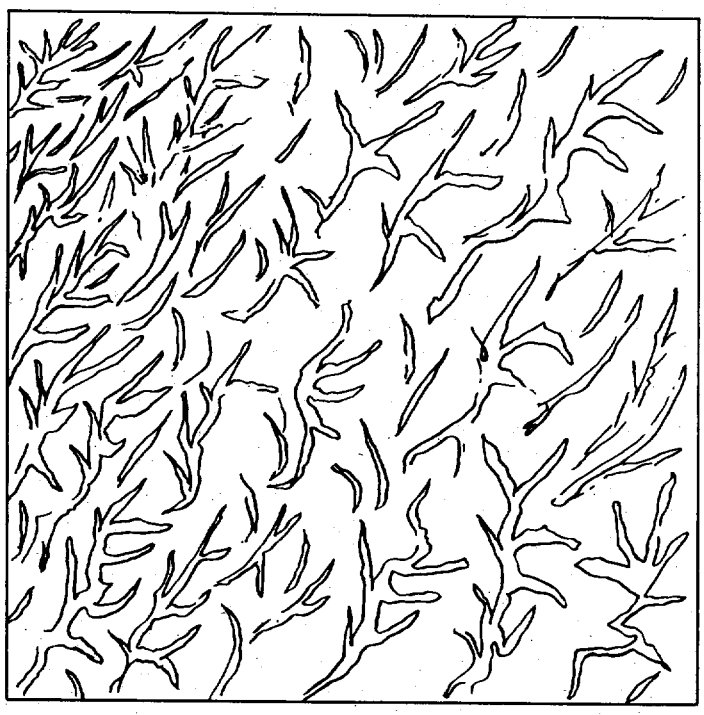
FIGURE · ONE
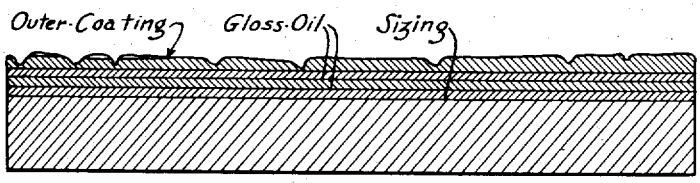
FIGURE · TWO
Inventor
Charles H. Egelhoff
By Attorney
Nathan & Bowman Reissued Oct. 4, 1927.

Re. 16,760

UNITED STATES PATENT OFFICE.

CHARLES H. EGELHOFF, OF COLUMBUS, OHIO.

PROCESS OF FORMING AN ARTISTIC PAINT FINISH.

Original No. 1,600,723, dated September 21, 1926, Serial No. 84,246, filed January 27, 1926. Application for reissue filed June 25, 1927. Serial No. 201,547.

My invention relates to a paint composition and also to the process of applying the composition to the surface to be treated in a manner to provide an artistic finish, it more particularly relating to a composition and process of applying the same which will result in a finish having numerous cracks or net work of fissures, which result in a design known as the "crackle" effect or "craze" finish.

The object of my invention is to provide a very simple composition and process of applying the same which will result in a finish having numerous cracks or fissures forming various designs of an artistic nature.

Fig. 1 is a plan view of the "crackle" finish.

Fig. 2 is a sectional view of same.

There is illustrated only one particular design disclosing a finish having numerous cracks or fissures, the process being susceptible of forming many and various designs of this "crackle" finish.

To that end the invention consists in providing a composition which is applied in two coats having different drying characteristics in that the undercoat dries slower than the outer coat, thereby causing the outer coat to slip or move on the under coat so as to produce checks or cracks which result in peculiar designs of an artistic nature.

For the under coat I preferably use what is known as gloss oil which consists of ordinary painters' varnish mixed with rosin in about the proportions of 50% benzine, 9% linseed oil, 1% oyster shell, and 40% rosin, which is in effect an elastic base.

For the outer coat, I preferably employ the following ingredients mixed substantially to the proportions stated for a given quantity of material: ½ pt. wood alcohol, ½ pt. denatured alcohol formula No. 5, ½ oz. highly refined benzine, $3\frac{15}{16}$ lbs. lead carbonate or ordinary white lead.

The under coat is of a character that will dry slower than the outer coat, as the alcohol and benzine will evaporate rapidly from the lead carbonate, and this difference in drying characteristics causes the lead carbonate to slip or move on the under coat of varnish and rosin, which movement of the outer coat causes it to check or crack in a manner to form arbitrary designs of various kinds.

The composition may be applied to any surface upon which the desired effect is to be secured such as interior walls and any desired coloring matter may be added to the ingredients of the outer coat. The artistic effect may be produced with large cracks or very small cracks or fissures, this depending upon the way in which the outer coating is applied, either lightly or heavily, and the design may be changed by changing the method of application, i. e. by applying the outer coat by vertical strokes of the brush instead of applying it by horizontal strokes of the brush. To that end, what has been called the outer coat may be applied by one or more applications, and if desired, what has been called the under coat may be also made in one or more applications of the varnish and rosin, and it is only necessary to let the under coat stand a short time before applying the outer coat.

It will only require a short time for the under coat to become sufficiently smooth and hard to apply the outer coat to the best advantage and very soon thereafter the outer coat will begin to slip upon the inner coat and this outer coat being of a plastic character, the ridges and grooves will be irregular in character and portions thereof will necessarily be squeezed or kneaded into raised or embossed surfaces.

It is to be understood that with changes in atmospheric conditions there will be corresponding changes in the method of application and the exact proportions of the ingredients, but I have endeavored to illustrate the composition of the materials and the method of application suitable for application under normal atmospheric conditions. Any one versed in the art will quickly learn by experience how to obtain the best results under any and all atmospheric conditions.

Nothing set forth and claimed in the divisional application Serial No. 117,242 filed June 21, 1926, is hereby waived.

Having thus described my invention, I claim as follows:

1. The method of applying a finish to a surface, consisting in applying to the surface two distinct liquid coatings having different drying characteristics, the first coating standing a short time before applying the second coating, the under coating having a relatively smooth surface and the outer of a plastic character, the differences in the drying characteristics of the two coatings being such as to cause the plastic coating to slip upon the under coating causing portions of the plastic coat to assume a raised or embossed character.

2. The method of applying a finish to a surface consisting in first applying to said surface a liquid coating of an elastic base, allowing same to stand a short time and thereafter applying an outer coating of a plastic character, the two coatings having different drying characteristics, the under coating being slower to dry than the outer coating whereby the outer plastic coating will slip upon the under coating.

3. The method of producing an artistic finish to a surface consisting in applying to said surface a liquid composition of a character that will quickly acquire a smooth surface, allowing same to stand a short time and thereafter applying an outer coat of a plastic character, the two coats having different drying characteristics, the under coat being slower to dry than the outer coat.

4. The method of producing an artistic finish to a surface consisting in applying to said surface a liquid composition comprising a mixture of varnish and rosin, allowing same to stand a short time, then applying to said surface another liquid composition comprising a mixture of white lead with alcohol and benzine having the characteristic of drying faster than the first composition.

In witness whereof, I have hereunto subscribed my name.

CHARLES H. EGELHOFF.